Jan. 27, 1931.    A. L. FOREMAN    1,790,299
PROTECTOR FOR CONTAINERS
Filed March 21, 1929
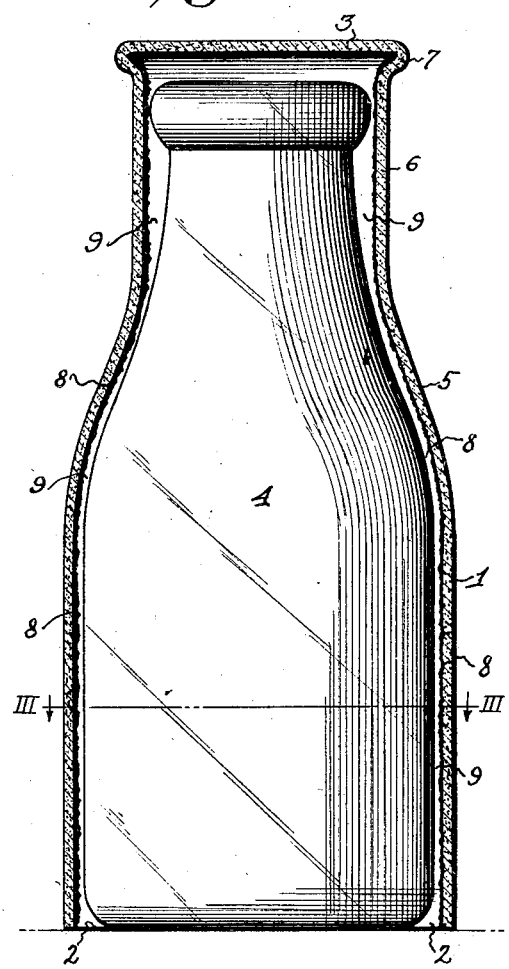
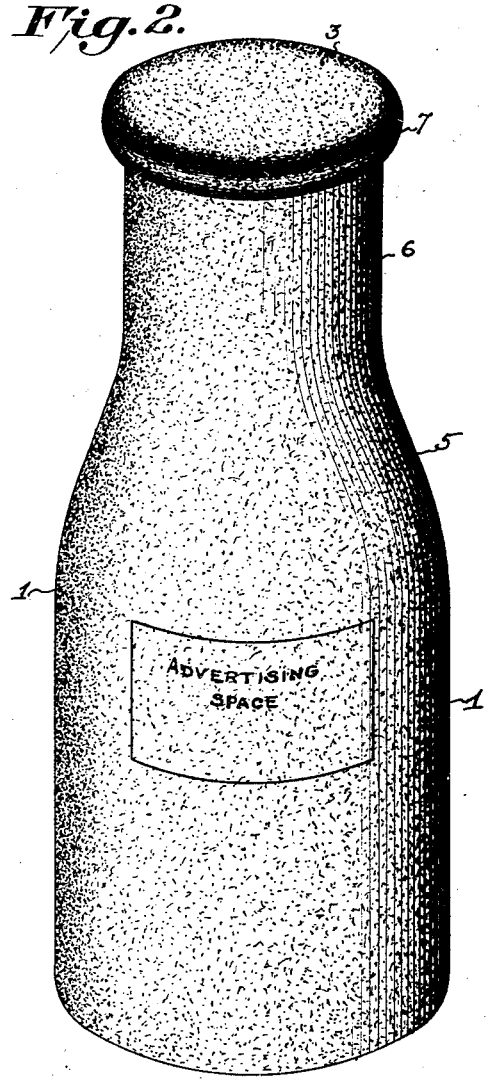
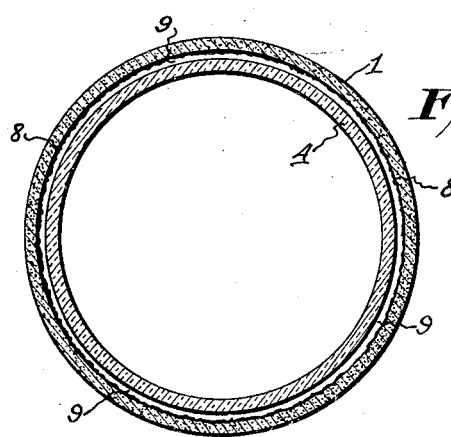
INVENTOR
Amos L. Foreman,
BY
ATTORNEY Patented Jan. 27, 1931

1,790,299

UNITED STATES PATENT OFFICE

AMOS L. FOREMAN, OF CHICAGO, ILLINOIS

PROTECTOR FOR CONTAINERS

Application filed March 21, 1929. Serial No. 348,879.

This invention relates to protectors for containers of food which is of such character as to be materially affected by exposure to extremes in temperature conditions, and more particularly relates to a protector for bottled milk.

One of the essential objects of the invention is the provision of a simple and inexpensive insulating element which may be readily placed over the bottle of milk, cream, or the like, so as to protect the same against freezing in cold temperatures and which will work with equal effectiveness to prevent spoiling when subjected to relatively high temperatures.

In the delivery of milk, cream and such perishable food articles, the containers are usually removed from cold storage where they are subjected to an even temperature above the freezing point, and are thereafter subjected in transit to the customer either to heat which would in a relatively short period of time be calculated to sour the milk or cream, or to such low temperatures as to freeze the same. Even if the milk or cream is in good condition when delivered at the customer's door, the bottles frequently are allowed to remain exposed either to heat or cold for long periods of time with resulting deleterious effects. It is, therefore, the object of the invention to avoid these difficulties and to effectively protect the milk or cream or other perishable food not only while in transit from the point of storage to the customer, but also after it has been delivered to the customer.

A still further object of the invention is the provision of a device of this character constructed of insulating material and so associated with the food container that such container is fully protected against extremes of temperature for long periods of time, the protector being so constructed and shaped to loosely fit over the container and produce a complete dead air space having the effect of supplementing the insulating character of the protector against extremes of temperature.

Further objects of the invention will appear as the following specific description is read in connection with the accompanying drawing which forms a part of this invention and in which Fig. 1 is a vertical sectional view of the protector shown associated with a milk bottle, Fig. 2 is a perspective view of the same showing the protector provided with an advertising space in which the name of the dealer may be conveniently placed so as to identify the origin of the protector, and Fig. 3 is a horizontal section taken on the line III—III of Fig. 1.

The protector herein shown is preferably made by the process disclosed in the Drake Patent 1,527,157 and consists of a body 1 of substantially inverted cup-shape form and substantially cylindrical throughout the major portion of its length. In the form illustrated where the protector is adapted for use on milk bottles, the lower end is left open as shown at 2 and the upper end is closed as indicated at 3 so that the temperature of the milk or other food article in the container 4 will not materially vary by reason of air currents rising or descending between the container and the protector. In the particular form illustrated, the side walls of the protector are of such shape as to generally conform to the shape of the container 4, that is, with a milk bottle substantially straight from the bottom edge up to the point where the formation of the neck starts. The side walls of the protector are then tapered inwardly as shown at 5 and merge into what may be termed the neck 6. Where the neck 6 joins the top 3, I preferably provide an annular outwardly extending rib 7 connecting the neck and top and forming a convenient means for gripping the protector either in lifting the same from the container 4 or placing it over such container.

As before stated the protector is preferably made under the process disclosed in the Drake patent supra, of paper pulp and is provided with a roughened interior surface as indicated at 8 in Figs. 1 and 3, which serves the purpose of providing a very effective friction surface which is of material advantage when handling the protector and the container as will be hereinafter understood.

The walls of the protector are made of sufficient thickness to effectively exclude hot or cold air and maintain the temperature of the container 4 for long periods of time after the protector has been associated therewith. The walls, however, are of sufficient flexibility to prevent breakage of the container if upset or dropped and can be flexed sufficiently to permit anyone to clamp the same against the walls of the container and lift both the protector and the container without fear of the container slipping out of the protector, the friction surface 8 materially aiding in this respect.

When the protector is arranged as shown over the milk bottle, there is formed between the two a dead air space 9, serving to effectively retain the temperature of the contents of the container and to effectively insulate such contents from exterior temperatures.

If desirable I may coat, impregnate or otherwise treat the container to make the same water-proof but such coating or impregnation should not in any way be such as to affect the frictional characteristics of the inner surface of the protector, as this quality is of paramount importance in lifting the container with the protector.

It will be noted that when the protector is associated with the container 4, there is a dead air space all around the container with the exception of the base of the container which is of course supported upon the same surface as the lower edge of the protector, thus sealing the dead air space effectively.

While I have shown a device which, as previously stated, is preferably made by the process disclosed in the Drake patent, I wish it to be clearly understood that it may be fashioned in any other manner and by any other process so long as the cost of production is kept within reasonable limits. I also wish it understood that while I have illustrated the invention in connection with milk bottles, the same may be readily shaped and constructed to effectively insulate containers of various shapes for perishable food products or in fact for the protection of any material which is of such character as to be affected by varying degrees of temperature.

What I claim is:

1. A protector for containers of perishable material, comprising a hollow insulating body circular in cross section and made an integral and unitary structure of compressed paper pulp and provided with yielding projections on its interior, closed at one end and open at its other end, and arranged to fit over the container spaced therefrom to provide a dead air space between the container and protector, said protector arranged to rest upon the supporting surface of the container, whereby said surface serves to seal the air space, and provide a roughened interior surface having yielding projections to increase frictional engagement with the container.

2. A protector for containers of perishable material, comprising a hollow body of insulating material, circular in cross section and made an integral and unitary structure of compressed paper pulp, closed at one end and open at the other, and arranged to loosely fit over the container and rest upon the supporting surface of the container to provide a sealed dead air space around the container, the walls of said protector being yielding to permit of their being flexed and brought into frictional contact on the container within, and a roughened interior surface formed during the shaping of the body for increasing the frictional engagement between the protector and container when the walls are flexed into engagement therewith, for transporting the container within the protector or hollow body when its open end is at the bottom.

In testimony whereof I hereunto affix my signature.

AMOS L. FOREMAN.